(12) United States Patent
Gazit et al.

(10) Patent No.: US 12,289,335 B2
(45) Date of Patent: Apr. 29, 2025

(54) SECURITY FINDING CATEGORIES-BASED PRIORITIZATION

(71) Applicant: Microsoft Technology Licensing, LLC, Redmond, WA (US)

(72) Inventors: Jonathan Gazit, Tel Aviv (IL); Moshe Israel, Ramat-Gan (IL); Dotan Patrich, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 18/105,928

(22) Filed: Feb. 6, 2023

(65) Prior Publication Data

US 2024/0267400 A1    Aug. 8, 2024

(51) Int. Cl.
*H04L 9/40*         (2022.01)
*G06F 16/28*        (2019.01)

(52) U.S. Cl.
CPC ........ *H04L 63/1433* (2013.01); *G06F 16/285* (2019.01); *H04L 63/1416* (2013.01); *H04L 63/1425* (2013.01)

(58) Field of Classification Search
CPC .................................................. H04L 63/1433
See application file for complete search history.

(56) References Cited

U.S. PATENT DOCUMENTS 7,359,962 B2 * 4/2008 Willebeek-LeMair ...................... H04L 63/1416
709/224

8,782,784 B1 * 7/2014 Bruskin .............. H04L 63/1425
726/22

(Continued)

FOREIGN PATENT DOCUMENTS

CN         113904881 A      1/2022

OTHER PUBLICATIONS

"Lift (data mining)", retrieved from << https://en.wikipedia.org/wiki/Lift_(data_mining) >>, Jun. 24, 2022, 3 pages.

(Continued)

*Primary Examiner* — Ponnoreay Pich
(74) *Attorney, Agent, or Firm* — Ogilvie Law Firm

(57) ABSTRACT

Some embodiments bridge a gap between focusing on security alerts raised by conditions and events that have already occurred, and focusing on vulnerabilities that might be exploited in the future. Alerts are organized into alert categories, vulnerabilities are organized into vulnerability categories, and are optionally supplemented with misconfiguration categories. Correlations are identified between alert categories and vulnerability or misconfiguration categories, and the correlation values noted, to produce category association rules. The alerts, vulnerabilities, and other security findings are gathered in some situations from multiple similar environments, and in some cases are filtered to pertain to similar resources or similar configurations. The category association rules are utilized to perform cybersecurity prioritizations such as assigning priority levels to alerts and assigning likelihood levels to potential breaches. Graphs showing resources and data flow paths are annotated with risk scores or with security findings relevant to the applicable category association rules.

20 Claims, 4 Drawing Sheets

(56) References Cited

U.S. PATENT DOCUMENTS

| | | | | |
|---|---|---|---|---|
| 2007/0143851 | A1* | 6/2007 | Nicodemus | G06F 11/3495 |
| | | | | 726/4 |
| 2009/0144216 | A1* | 6/2009 | Zhou | H04L 63/1416 |
| | | | | 706/47 |
| 2012/0137367 | A1* | 5/2012 | Dupont | G06F 21/00 |
| | | | | 726/25 |
| 2012/0185945 | A1* | 7/2012 | Andres | G06F 21/568 |
| | | | | 726/25 |
| 2013/0298244 | A1* | 11/2013 | Kumar | G06F 21/51 |
| | | | | 726/25 |
| 2015/0319185 | A1* | 11/2015 | Kirti | H04L 63/1416 |
| | | | | 726/23 |
| 2019/0052665 | A1* | 2/2019 | Mahieu | G06N 5/01 |
| 2019/0260793 | A1* | 8/2019 | Stockdale | G06F 16/2455 |
| 2021/0168169 | A1* | 6/2021 | Kim | H04L 63/1466 |
| 2022/0156380 | A1* | 5/2022 | Pradzynski | G06F 21/577 |
| 2023/0224324 | A1* | 7/2023 | Karabey | H04L 63/1466 |
| | | | | 726/23 |
| 2023/0370334 | A1* | 11/2023 | Mannengal | H04L 43/04 |
| 2024/0073229 | A1* | 2/2024 | Sivaswamy | H04L 63/1425 |
| 2024/0169068 | A1* | 5/2024 | Tishbi | G06F 21/6218 |
| 2024/0267400 | A1* | 8/2024 | Gazit | H04L 63/1433 |

OTHER PUBLICATIONS

"What Is Mitre Att&ck and How Is It Useful", retrieved from << https://www.anomali.com/resources/what-mitre-attck-is-and-how-it-is-useful>>, no later than Feb. 5, 2022, 9 pages.

"Common Vulnerabilities and Exposures", retrieved from << https://en.wikipedia.org/wiki/Common_Vulnerabilities_and_Exposures>>, Aug. 5, 2018, 5 pages.

International Search Report and Written Opinion received for PCT Application No. PCT/US2024/013626, Apr. 23, 2024, 13 pages.

* cited by examiner

PHASE 1 700 : ENRICH FINDINGS WITH EXPLOIT CATEGORIES

PHASE 2 800 : LEARN CATEGORY ASSOCIATION RULES

PHASE 3 900 : DETERMINE LIKELIHOOD / RISK OF BREACH

SECURITY FINDING CATEGORIES-BASED PRIORITIZATION

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, able to determine the scope of an attack or vulnerability, or able to end every detected cyberattack. But sometimes combining and layering a sufficient number and variety of defenses and investigative tools will prevent an attack, deter an attacker, or at least help limit the scope of harm from an attack or a vulnerability.

To implement defense in depth, cybersecurity professionals consider the different kinds of attacks that could be made against a computing system, and the different vulnerabilities the system may include. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place or removing a particular vulnerability to attack. They investigate the scope of an attack, and try to detect vulnerabilities before they are exploited in an attack. Some defenses or investigations might not be feasible or cost-effective for the particular computing system. However, improvements in cybersecurity remain possible, and worth pursuing.

SUMMARY

Some embodiments described herein address technical challenges of computer technology which functions to provide security against cyberattacks. More particularly, some embodiments address computing system technology challenges such as how to distinguish false positive alerts from alerts that indicate an actual security breach, and how a security technology can accurately predict future breaches.

Some embodiments described herein include data structures which associate an alerts category with an exploit openings category in a category association rule. The category association rule data structure also includes a correlation value which indicates an extent to which the co-occurrence of the particular categories (through the presence of items in the categories) is statistically important or is merely a coincidence. These category association rule data structures are applied in a practical application such as a conditional access control system, insider risk management system, data loss prevention system, or other security control, to enhance computing system security functionality.

For example, assume an alert in the particular category of alerts is received in an environment, and a vulnerability or a misconfiguration in the exploit openings category is also detected in that environment, and assume that the correlation value of the rule indicates the co-occurrence of these particular categories is not statistically important. Then in this example an embodiment treats the received alert as a false positive. However, when the correlation value indicates statistical importance, the received alert is treated as a high priority indication of a breach.

As another example, assume a vulnerability or a misconfiguration in the particular exploit openings category is detected in an environment E, and assume one or more category association rules involving that exploit openings category each have respective correlation values that indicate a high statistical importance. Then a breach is very likely in the environment E. In some embodiments, the greater the number of alert categories there are which the particular exploit openings category is associated with in a statistically important manner, and the more statistically important those associations are per their correlation values, and the more frequently any alerts in those alert categories have occurred historically in E or in environments similar to E, the greater the likelihood is of a breach in E.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. To the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
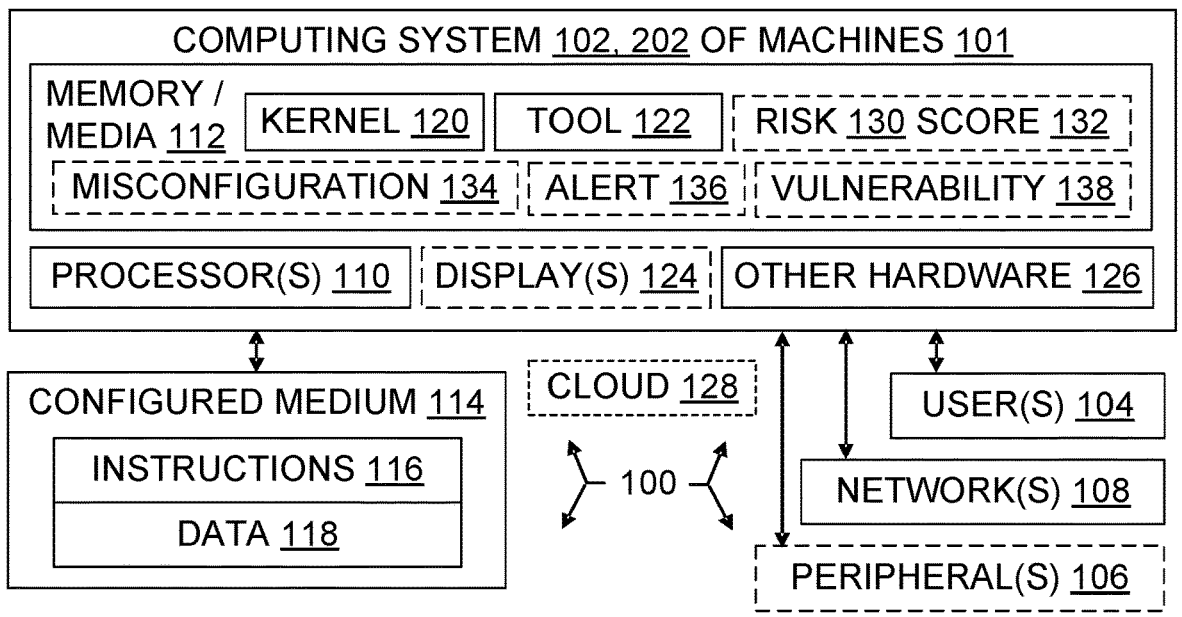
FIG. 1 is a diagram illustrating aspects of computer systems and also illustrating configured storage media, including some aspects generally suitable for systems which provide cybersecurity prioritization functionality.

Some environments have a functional separation between alerts, on one hand, and vulnerabilities and misconfigurations, on the other hand. Tools and technical personnel often focus on one or the other. One focus is on alerts, and in particular on the problem of how to distinguish false positive alerts and otherwise prioritize a flood of alerts, because the technical resources and personnel available are too often being overwhelmed by a flood of alerts. This is a defender's perspective. A different focus is on detecting vulnerabilities, e.g., finding exploitable misconfigurations, during penetration testing or security reviews. This is an attacker's perspective.

One way to bridge these two perspectives is to connect alerts to vulnerabilities in an incident investigation. As a hypothetical example, a bridging approach during an incident investigation would note that a vulnerability V29 was exploited by an attacker, followed by a breach and some damage, which went on until an alert A235 led to an investigation by security personnel that revealed the attack and imposed countermeasures against the attack.

Valuable lessons can be learned from incident investigations. For instance, the example investigation could determine that an earlier alert A37 would have revealed the attack if it had been investigated sooner, but was not investigated because it had a low priority. Investigators may decide that in the future alerts like alert A37 should receive a higher priority, for instance, or they may suggest that a particular event should also generate a new alert instead of merely being logged. The investigators might also recommend that scanning for the vulnerability V29 be performed more frequently, and recommend that a reminder be sent to the engineers who are responsible for setting up systems that will have vulnerability V29 unless they are configured to avoid it. In this way, hindsight can be used to influence how future alerts are prioritized.

Investigator recommendations are useful results of connecting alerts and vulnerabilities in an incident investigation. As taught herein, however, alerts can also be connected to vulnerabilities in other ways, in addition to the labor-intensive and incident-specific connections that are made during incident investigations. For instance, ways of connecting alerts to vulnerabilities via correlation are described herein. Such connections will help security personnel prioritize the flood of data being reported to them, and also permit more accurate predictions of future problems.

Teachings herein address technical challenges, such as determining which alerts to connect to which vulnerabilities, deciding how to structure those connections within a computing system, and figuring out how to computationally utilize those connections to distinguish false positives or predict future attacks. Embodiments described herein meet these and other technical challenges and provide technical benefits as a result.

For example, some embodiments associate a category in a categorized alerts collection with a category in a categorized exploit openings collection, thereby producing a category association rule, and assign the category association rule a correlation value which represents a measure of a correlation of the category in the categorized alerts collection with the category in the categorized exploit openings collection. This has the benefit of creating a category association rule data structure which connects alerts to vulnerabilities in an efficient and effective way that does not require labor-intensive and incident-specific connections and yet still supports prioritization of alerts. Another benefit is that the category association rule data structure also supports a prediction of a breach, even in the absence of an alert that was tied to a similar breach by an incident investigation.

Some embodiments create the categorized alerts collection and create the categorized exploit openings collection. In some embodiments, creating the collections includes determining that two environments are similar, and including in at least one of the collections security findings which are collectively from the two environments. This has the benefit of leveraging security findings from an environment F outside a given environment E in order to distinguish false positives or predict breaches inside the environment E. As a result, an attack which succeeded in F can be detected and contained faster inside E, or in some cases can be prevented entirely in E.

Some embodiments repeat the associating of the categories, and the assigning of the correlation value, and include a risk score production performed at least monthly using updated collections, for at least three months. This has the benefit of making prioritizations and controls that use the category association rule data structure more current and more tailored to a particular secured environment, and hence more effective, than would be the case, e.g., if more general and less dynamic data such as CVEs (Common Vulnerabilities and Exposures) were relied on without the category association rule data structure.

Some embodiments include a resource similarity evaluator which upon execution by a processor set produces a measure of a similarity of two resources. In some embodiments, creating the collections includes determining that two resources are similar, and including in at least one of the collections security findings which collectively pertain to the two resources. This has the benefit of leveraging security findings about a resource R in order to distinguish false positives or predict breaches involving a similar resource S. As a result, an attack which succeeded against R can be detected and contained faster when it threatens S, or in some cases can be prevented entirely.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 128. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 124, keyboards 106, and other peripherals 106, via typed text, touch, voice, movement, computer vision, gestures, and/or other forms of I/O. Virtual reality or augmented reality or both functionalities are provided by a system 102 in some embodiments. A screen 124 is a removable peripheral 106 in some embodiments and is an integral part of the system 102 in some embodiments. The user interface 330 supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 128 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software apps, on mobile devices 102 or workstations 102 or servers 102, compilers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 126 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 124, some operating environments also include other hardware 126, such as batteries, buses, power supplies, wired and wireless network interface cards, for instance. The nouns "screen" and "display" are used interchangeably herein. In some embodiments, a display 124 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 126 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, cybersecurity prioritization functionality 208 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was previously known.

In any later application that claims priority to the current application, reference numerals may be added to designate items disclosed in the current application. Such items may include, e.g., software, hardware, steps, processes, systems, functionalities, mechanisms, data structures, resources, machine learning or statistical or other correlation algorithm implementations, or other items in a computing environment, which are disclosed herein but not associated with a particular reference numeral herein. Corresponding drawings may also be added.

More About Systems

Figure 2:
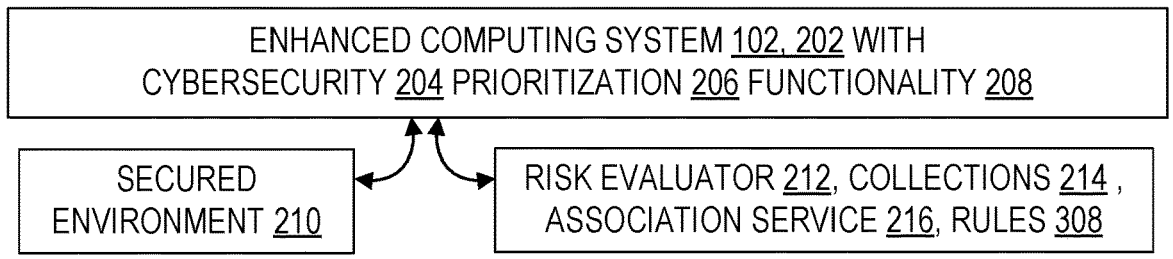
FIG. 2 is a block diagram illustrating a secured environment and an enhanced system which is configured with a cybersecurity prioritization functionality.

FIG. 2 illustrates a computing system 102 configured by one or more of the cybersecurity prioritization enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. Although shown separately in FIG. 2, one or more of the risk evaluator 212, category collections 214, association service 216, and rules 308 are part of the system 202 in some embodiments. Likewise, the secured environment 210 is part of the system 202 in some embodiments. FIG. 2 items are discussed at various points herein, and additional details regarding them are provided in the discussion of a List of Reference Numerals later in this disclosure document.

Figure 3:
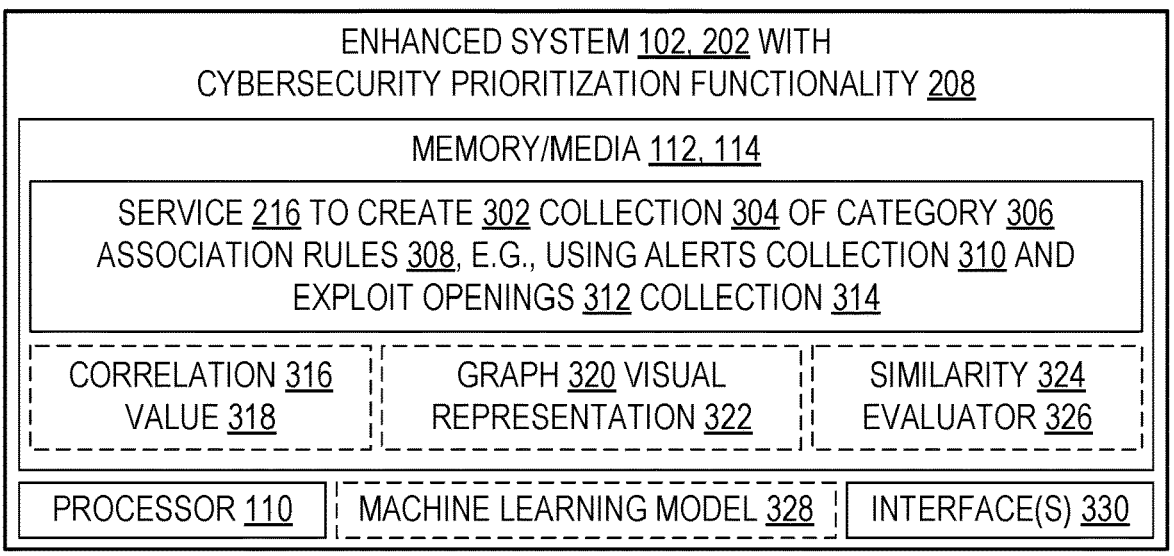
FIG. 3 is a block diagram illustrating aspects of a system enhanced with various aspects of cybersecurity prioritization functionality.

FIG. 3 shows some aspects of some enhanced systems 202. This is not a comprehensive summary of all aspects of enhanced systems 202 or all aspects of cybersecurity prioritization functionality 208. Nor is it a comprehensive summary of all aspects of an environment 100 or environment 210 or system 202 or other context of an enhanced system 202, or a comprehensive summary of all cybersecurity prioritization mechanisms in functionality 208 for potential use in or with a system 102. FIG. 3 items are discussed at various points herein, and additional details regarding them are provided in the discussion of a List of Reference Numerals later in this disclosure document.

Figure 4:
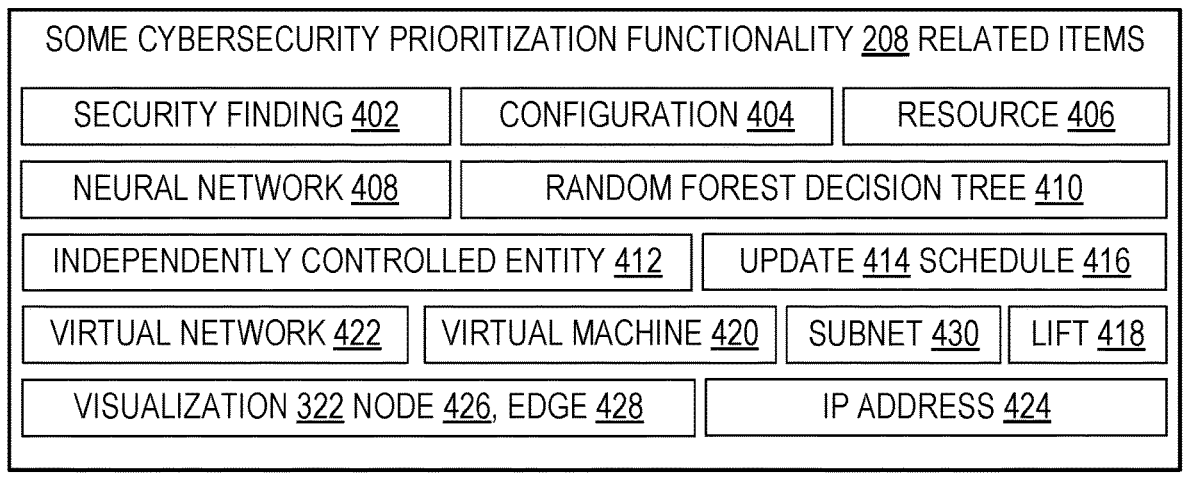
FIG. 4 is a block diagram illustrating some items related to cybersecurity prioritization.

FIG. 4 shows some items related to cybersecurity prioritization 206 functionality 208. This is not a comprehensive summary of all prioritization-related aspects of enhanced systems 202 or all aspects of cybersecurity 204 in prioritization functionality 208. FIG. 4 items are discussed at various points herein, and additional details regarding them are provided in the discussion of a List of Reference Numerals later in this disclosure document.

Figure 10:
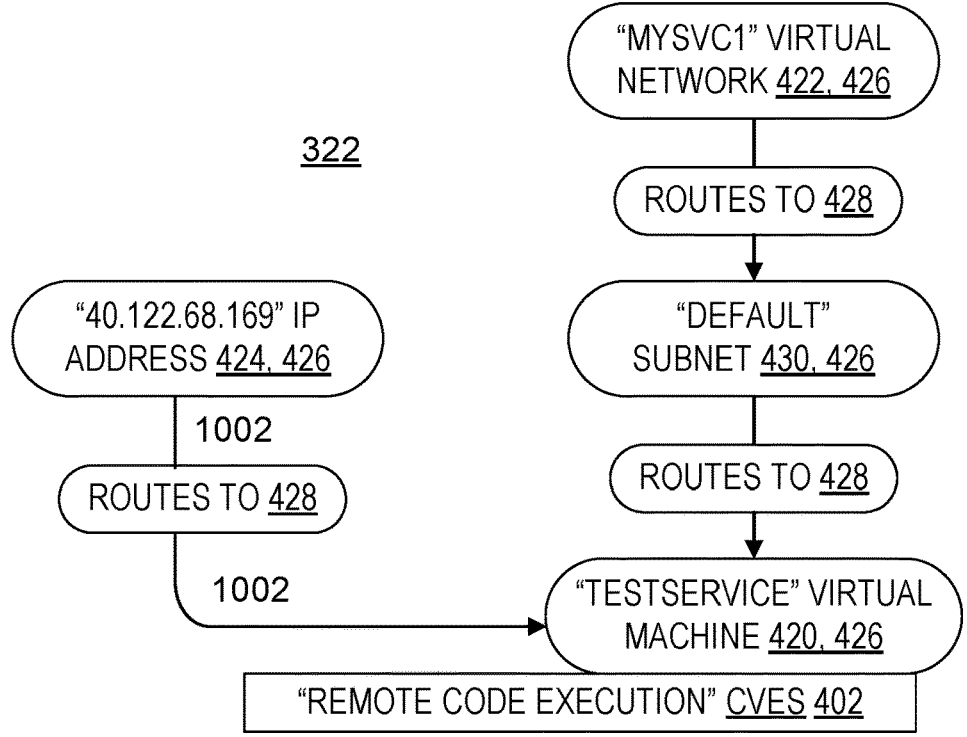
FIG. 10 illustrates a graph visualization with a cybersecurity prioritization annotation.

The other figures are also relevant to enhanced systems 202. In particular, FIGS. 5 through 9 illustrate processes of system 202 operation, and FIG. 10 illustrates a user interface display 124 visualization 322 along the lines of content displayed by some processes 600.

In some embodiments, the enhanced system 202 is networked through an interface 330. In some, an interface 330 includes hardware such as network interface cards, software such as network stacks, APIs, or sockets, combination items such as network connections, or a combination thereof.

Some embodiments provide or use a computing system 202 which includes: (a) a categorized alerts collection 214 (collection of categorized alerts 136, e.g., collection of populated alert categories 306), (b) a categorized exploit openings collection 214, e.g., categorized vulnerabilities 138 or categorized misconfigurations 134 or both, (c) an association service 216, e.g., a category enricher 702 which will associate categories 306 by correlative occurrences, a cross-finding enricher 902 which will cross correlate alerts 136 and vulnerability findings 138 based on categories 306 and association rules 308, or both, (d) a correlation value 318 which is a measure of the strength of correlation 316 in an association rule, e.g., a lift value 418, (e) a risk evaluator 212 which will, e.g., determine the likelihood 514 of a breach 516 based on an existing correlation 318 between security alerts 136 and vulnerability findings 138, (f) a risk score 132, e.g., a value indicating the likelihood 514 of a future breach 516 which exploits an existing vulnerability 138 (e.g., attack path 1002) and an existing correlation 316 with security alerts 136 in other environments 100. In some variations, the risk score 132 can be based on a vulnerability 138, a misconfiguration 134, or an alert 136.

As an example, assume the following hypothetical. In an embodiment, a sensitive-document-alerts category SDACat includes a sensitive-document-opened alert, a sensitive-document-saved alert, a sensitive-document-moved alert, and a sensitive-document-deleted alert. A browsing-alerts category BACat includes a malware-site-URL alert, and a private-cloud-storage-URL alert. An initial-access-vulnerabilities category IAVCat includes a drive-by-compromise vulnerability, a public-facing-application vulnerability, and a phishing vulnerability. A persistence-vulnerabilities category PVCat includes an account-manipulation vulnerability, an autostart vulnerability, and a print-processor vulnerability. Four category association rules 308 have been proactively produced:

| Rule | Alert Category | Vulnerability Category | Correlation |
|---|---|---|---|
| 1 | SDACat | IAVCat | 20 |
| 2 | SDACat | PVCat | 12 |
| 3 | BACat | IAVCat | 38 |
| 4 | BACat | PVCat | 11 |

In this context, assume a security analyst or a security tool commands the embodiment to prioritize a new sensitive-document-opened alert on a system 210 whose printer drivers are two versions older than the current recommended version and hence pose a print-processor vulnerability. Applicable Rule 2 has a relatively low correlation of 12 on a scale of 0 to 50 in this example, so the new sensitive-document-opened alert is treated as low priority.

By contrast, assume the embodiment is commanded to prioritize a new malware-site-URL alert for an URL in a potential phishing email. Applicable Rule 3 has a relatively high correlation of 38, so the new malware-site-URL alert is treated as high priority.

Now assume the embodiment is commanded to estimate the likelihood of a future breach exposing content of a sensitive document, when none of the existing security tools protect against any of the PVCat persistence vulnerabilities and none of the BACat browsing alerts have yet been raised. Applicable Rule 4 has a relatively low correlation of 11 in this example, so the estimated likelihood of such a breach under the stated conditions is low.

Some embodiments include a computing system 202 which is configured to enhance cybersecurity. The system 202 includes: a digital memory 112 and a processor set 110 including at least one processor, the processor set in operable communication with the digital memory. The system 202 also includes a non-empty categorized alerts collection 310, 214 including at least one alert category 306, each alert category containing alerts 136; and a non-empty categorized exploit openings collection 314, 214 including zero or more security vulnerability categories 306 containing vulnerabilities 138 and zero or more misconfiguration categories 306 containing misconfigurations 134.

This system 202 also includes an association service 216 which upon execution by the processor set produces a non-empty rule collection 304 including at least one category association rule 308. Each category association rule associates a category 306 in the categorized alerts collection with a category 306 in the categorized exploit openings collection. Each category association rule has a correlation value 318 representing a measure of a correlation 316 of the category in the categorized alerts collection with the category in the categorized exploit openings collection.

This system 202 also includes a risk evaluator 212 which upon execution by the processor set produces a risk score 132 based on an exploit opening 312 or an alert 136 or both. For instance, the risk score may be calculated as a normalized product of the correlation value with a prior risk score and values representing user characteristics such as user admin level or anomalous behavior, and alert or vulnerability severity. Many other risk score calculations will be recognized by one of skill.

Some embodiments use data from multiple environments 100 which are collectively accessible to multiple independently controlled entities 412, e.g., multiple customer environments. Certain environments 100 are "collectively accessible" to certain entities 412 when each environment is accessible to at least one of the entities. It is allowed, but not required, that one or more of the entities individually has access to every one of the environments. The access in question is understood to be legal and fully authorized.

For example, assume an entity IEC-1 has access to environments Env-A, Env-B, and Env-C, entity IEC-2 has access to environments Env-A and Env-D, and entity IEC-3 has access to environments Env-B and Env-C. Then the four environments Env-A, Env-B, Env-C, and Env-D are collectively accessible to the three entities IEC-1, IEC-2 and IEC-3. If none of the three entities IEC-1, IEC-2 and IEC-3 have access to a fifth environment Env-E, then Env-E is not collectively accessible to the three entities.

In some embodiments, the categorized alerts collection 310 includes alerts from multiple environments 100 which are or were collectively accessible to multiple independently controlled entities 412. In particular, alert data from an environment of one customer of a service provider can be sanitized and accessed by an embodiment in order to help the embodiment discern category correlations 316 and enhance security in another customer's environment.

In some embodiments, the categorized exploit openings collection 314 includes at least one of the following: vulnerabilities from multiple environments which are or were collectively accessible to multiple independently controlled entities; or misconfigurations from multiple environments which are or were collectively accessible to multiple independently controlled entities.

Some embodiments provide or use a graph 320 which is enhanced as taught herein to show the risk score 132, show a security finding 402 basis of a category association rule 308, or show a security finding 402 basis of the risk score. In one example scenario, a graph of an exposed Kubernetes® (mark of The Linux Foundation) pod running a container with a high severity vulnerability also shows a risk score that is based on current data, e.g., alerts, vulnerabilities, misconfigurations. The data is obtained from multiple customer environments and processed using category correlations as taught herein, instead of basing the risk score primarily or solely on essentially static CVE severity levels.

For example, in some situations a graph 320 represents an Internet-exposed pod running a container with high severity vulnerabilities. Graphs 320 and their nodes and edges may represent, e.g., virtual machines 420, IP addresses 424, storage accent access, Internet access, operating system 120, alert(s) 136, network 108 or 422 routing, configuration issues, vulnerabilities, and other aspects of a secured environment 210. In some embodiments, graphs 320 represent what access or other operations can be done, not necessarily what has been done.

In some embodiments, computing system 202 includes a graph data structure 320 having a visual representation 322, which is also referred to as a visualization 322. The graph is not a bar chart, pie chart, or line graph, but is rather a graph which has nodes 426 connected by at least one edge 428. The security finding 402 is an alert, a vulnerability, or a misconfiguration. The system 202 is further characterized in at least one of the following ways: the visual representation 322 includes an indication of the risk score; the visual representation 322 identifies a security finding that is utilized by the association service to produce at least one category association rule; or the visual representation 322 identifies a security finding that is utilized by the risk evaluator to produce the risk score.

For example, FIG. 10 illustrates a visual representation 322. Because FIG. 10 is a patent drawing, it includes reference numerals, e.g., 322, 402, 422, 424, 426, 428, which would not appear on a visualization display 124 that is controlled by software implementing an embodiment in a practical application such as a cloud security posture management tool 122. However, the nodes and edges of the FIG. 10 visualization would be displayed. In this example the FIG. 10 text would also be displayed, potentially with different capitalization, e.g., "mysvc1 virtual network", "routes to", "default subnet", "testservice virtual machine", "40.122.68.169 IP address", and "Remote Code Execution CVEs". In this example, "CVEs" is underlined to indicate that it represents an executable link permitting user interface navigation to a list of some CVEs associated with the testservice virtual machine. These CVEs are examples of security findings, and they are identified in the visualization by the displayed executable link, and also by the displayed text "Remote Code Execution".

Some embodiments include similarity 324 of resources 406 or similarity 324 of environments 100, or both, in the calculations that lead to the risk score 132. Similarity 324 is measured by one or more similarity evaluators 326, using metrics such as a number of identical characteristics of items being compared for similarity, a number of characteristics within a predefined tolerance, or predefined lists of items which are deemed similar (or deemed not similar).

In some scenarios, the association service 216 looks for correlations 316 of alert categories with exploit opening categories in which an alert category is defined as a set of alerts 136 of specified kinds from similar environments, or alerts 136 of specified kinds regarding similar resources, or both.

For instance, the alert categories in one example include a category of email activity alerts from four similar environments and a different category of login activity alerts from seven environments which includes three of the four environments. In this example, different similarity criteria are used for the respective alert categories.

In some scenarios, an exploit opening category such as a vulnerability 138 category is defined to include a set of vulnerabilities of specified kinds from similar environments, or vulnerabilities of specified kinds regarding similar resources, or both. Misconfiguration 134 categories are likewise defined based in part on similarity 324, in some embodiments.

For instance, the exploit opening categories 306 in one example include a category of three similar firewall's respective misconfigurations, and also include a category of seven vulnerable logging software agents.

In some embodiments, the system 202 includes at least one of the following: a resource similarity evaluator 326 which upon execution by the processor set produces a measure of a similarity 324 of two resources 406; or an environment similarity evaluator 326 which upon execution by the processor set produces a measure of a similarity 324 of two environments 100.

Some embodiments use machine learning to update categories 306 used in association rules. In some embodiments, the association service 216 includes a machine learning model 328, e.g., a neural network 408 with decoders or a random forest decision tree 410. Lift scoring 418 measures association strength in some embodiments.

Other system embodiments are also described herein, either directly or derivable as system versions of described processes or configured media, duly informed by the extensive discussion herein of computing hardware.

Although specific cybersecurity prioritization architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of cybersecurity prioritization functionality, for example, as well as different technical features, aspects, mechanisms, software, operational sequences, data structures, environment or system or resource characteristics, tool query capabilities, telemetry, logs, or other functionality consistent with teachings provided herein, and may otherwise depart from the particular examples provided.

Processes (a.k.a. Methods)

Figure 5:
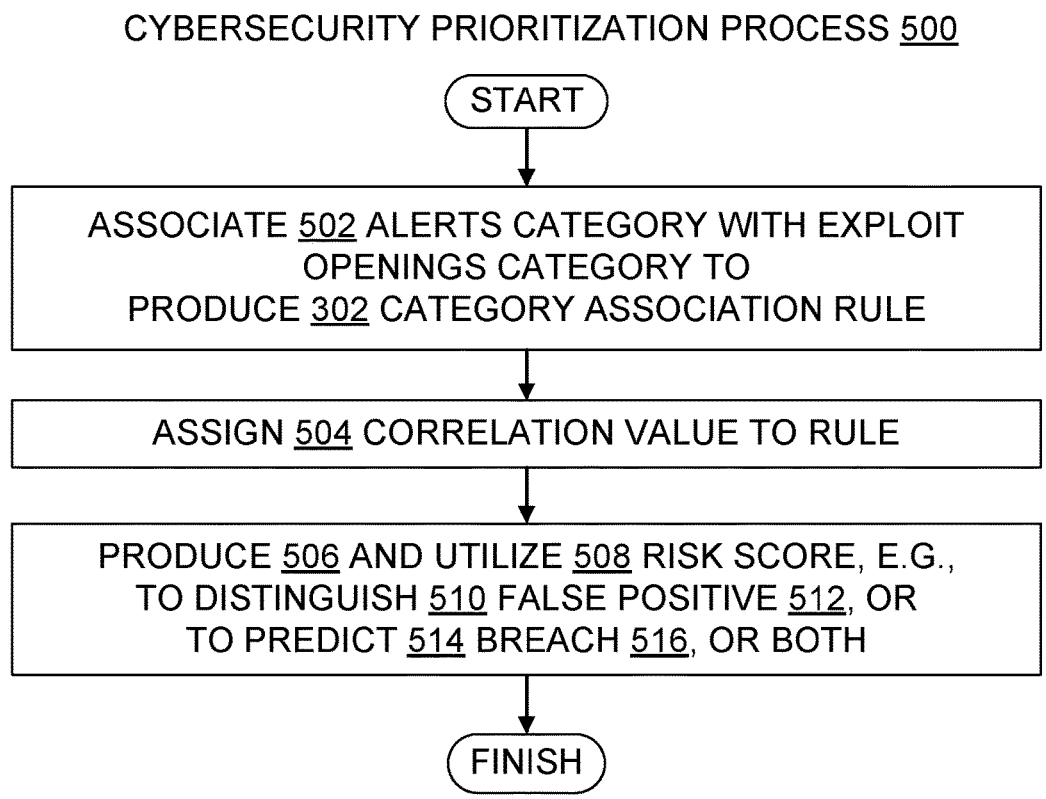
FIG. 5 is a flowchart illustrating steps in some cybersecurity prioritization processes.
Figure 6:
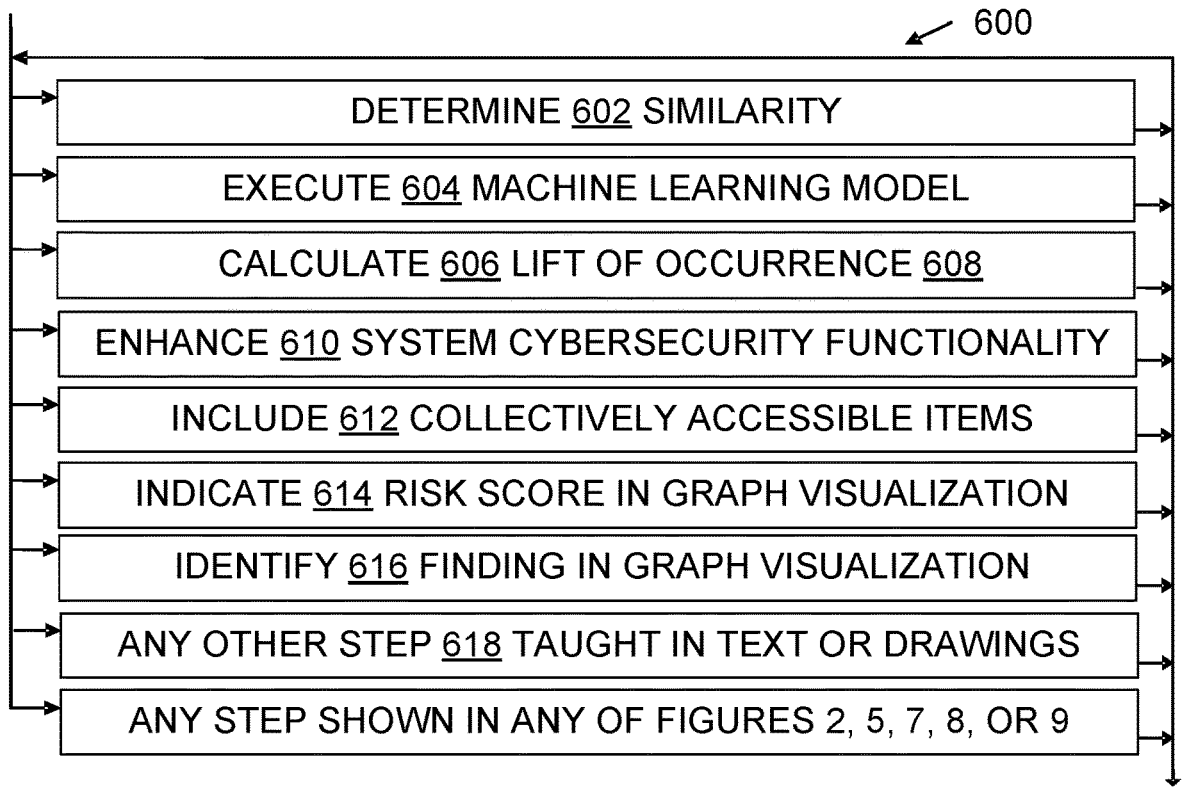
FIG. 6 is a flowchart further illustrating steps in some cybersecurity prioritization processes, and incorporating FIG. 5.
Figure 7:
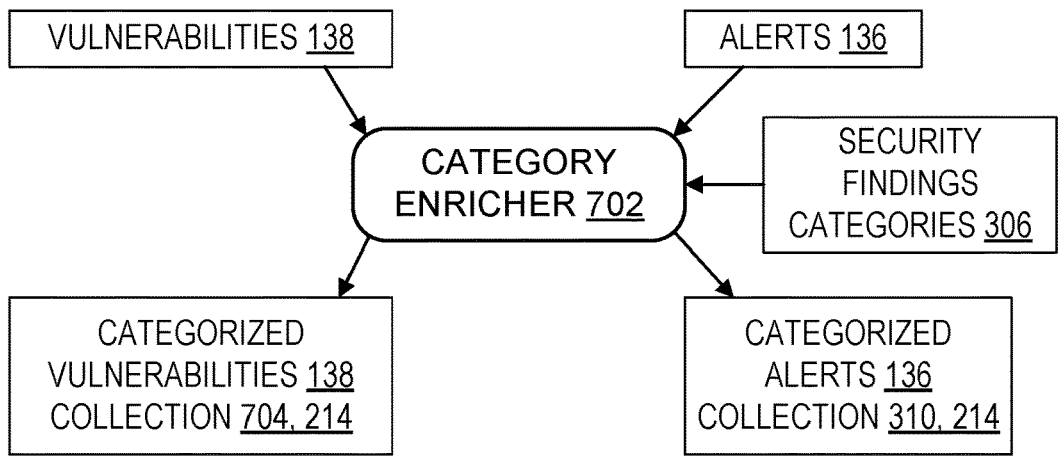
FIG. 7 is a data flow diagram illustrating aspects of a first phase of some cybersecurity prioritization processes.
Figure 8:
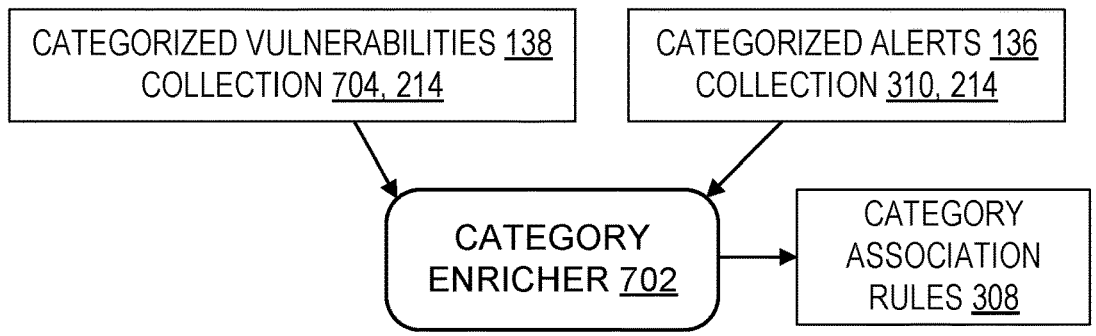
FIG. 8 is a data flow diagram illustrating aspects of a second phase of some cybersecurity prioritization processes.
Figure 9:
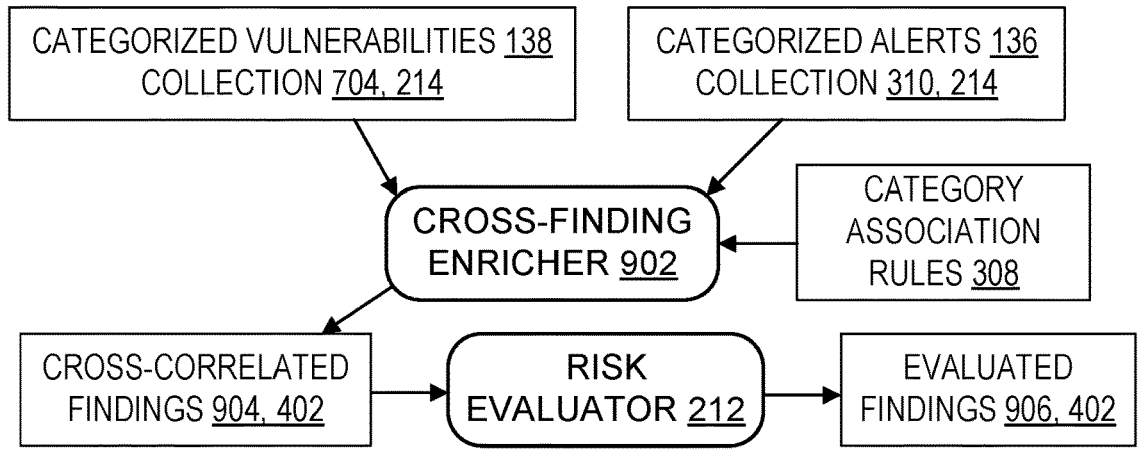
FIG. 9 is a data flow diagram illustrating aspects of a third phase of some cybersecurity prioritization processes.

Processes (which are also be referred to as "methods" in the legal sense of that word) are illustrated in various ways herein, both in text and in drawing figures. FIGS. 5 and 6 each illustrate a family of processes 500 and 600 respectively, which are performed or assisted by some enhanced systems, such as some systems 202 or another cybersecurity prioritization enhanced system as taught herein. Process family 500 is a proper subset of process family 600. FIGS. 7 to 9 illustrate phases of some cybersecurity prioritization processes 600; a given process may include steps of one or more of the phases.

FIGS. 1 to 4 illustrate cybersecurity prioritization system 202 architectures with implicit or explicit actions, e.g., generating, sending, and receiving alerts 136, detecting vulnerabilities 138, calculating similarity 324, training a machine learning model 328, or otherwise processing data 118, in which the data 118 includes, e.g., alerts 136, vulnerabilities 138, configurations 404, misconfigurations 134, risk scores 132, category data structures 306, category collection data structures 214, and rule data structures 308, among other examples disclosed herein. FIG. 10 illustrates displays produced by some processes 600 which involve a graph visualization 322.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in an item name. But no process claimed herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 6. FIG. 6 is a supplement to the textual examples of embodiments provided herein and the textual descriptions of embodiments provided herein. In the event of any alleged inconsistency, lack of clarity, or excessive breadth due to an aspect or interpretation of FIG. 6, the text of this disclosure shall prevail over that aspect or interpretation of FIG. 6.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 6 to be non-operable, the sequence S is not within the scope of any claim. Any assertion otherwise is contrary to the present disclosure.

Some embodiments improve the security function of a computing system 202 in scenarios that involve alerts 136 to be prioritized for responsive control activity, or vulnerabilities 138 or possible misconfigurations 134 to be assessed as security risks 130. By improving computer security functionality, embodiments improve the capability of a system to protect data availability, confidentiality, integrity, or privacy.

Some embodiments provide or utilize a process 600 performed by computing system 202 to enhance cybersecurity. The process includes: associating 502 a category in a non-empty categorized alerts collection with a category in a non-empty categorized exploit openings collection, thereby producing 302 a category association rule, the categorized alerts collection including at least one alert category, each alert category containing alerts, the categorized exploit openings collection including zero or more security vulnerability categories containing vulnerabilities and zero or more misconfiguration categories containing misconfigurations; assigning 504 the category association rule a correlation value which represents a measure of a correlation of the category in the categorized alerts collection with the category in the categorized exploit openings collection; and producing 506 a risk score based on the category association rule and on at least one of: an alert, a vulnerability, or a misconfiguration.

In some embodiments, the process includes utilizing 508 the risk score by distinguishing 510 an accurate security breach alert from a false positive security breach alert. For instance, if a subsequent investigation that is spurred or based at least in part of the security breach alert reveals the existence of a security breach 516, then the security breach alert is distinguished 510 as being accurate and not being a false positive 512. Conversely, if no security breach 516 related to the alert occurs within a substantial period of time after the alert, e.g., a month, then treatment of the alert as a false positive 512 is accurate.

In some embodiments, the process includes utilizing 508 the risk score by accurately predicting 514 a security breach prior to an occurrence of the security breach. For instance, if a security breach 516 related to the alert occurs within a specified period of time after the alert, e.g., a week, then the prediction is accurate.

In some embodiments, category content—and therefore association rules—depend on findings 402 from similar environments, findings 402 about similar configurations, or findings 402 about similar resources. Certain security findings are "collectively from" two environments when the findings include at least one finding from each environment. Likewise, security findings "collectively pertain" to two items (configurations or resources) when for each of the items there is at least one of the findings that pertains to that item. A finding "pertains" to an item when the finding identifies the item or indicates that the item is missing or could be optimized.

In some embodiments, a security finding is an alert, a vulnerability, or a misconfiguration. In some of these, the process 600 includes creating 302 the collections, and creating the collections includes determining 602 that two environments are similar. At least one of the collections includes security findings which are collectively from the two environments.

For instance, in some cases two environments are considered similar when they run the same kind of kernel 120, have the same number of processors plus or minus twenty percent, have the same kind of network architecture (e.g., virtual network in a public cloud), and have the same number of user accounts within one order of magnitude. Many other examples of similar or dissimilar environments will be recognized by one of skill in the computing arts.

In some embodiments, a security finding is an alert, a vulnerability, or a misconfiguration. In some of these, the process 600 includes creating 302 the collections, and creating the collections includes determining 602 that two configurations 404 are similar. At least one of the collections includes security findings which collectively pertain to the two configurations.

For instance, in some cases two configurations are considered similar when they configure the same kind of device (e.g., public-facing firewalls) from the same vendor, and have the same release level (e.g., latest firewall microcode and latest device management tool version). Many other examples of similar or dissimilar configurations will be recognized by one of skill in the computing arts.

In some embodiments, a security finding is an alert, a vulnerability, or a misconfiguration. In some of these, the process 600 includes creating 302 the collections, and creating the collections includes determining 602 that two resources 406 are similar. At least one of the collections includes security findings which collectively pertain to the two resources.

For instance, in some cases two resources are considered similar when they are the same kind of resource (e.g., storage versus compute, or container versus virtual machine) with the same capability within a factor of five (e.g., storage capacity, processing power, bandwidth). Many other examples of similar or dissimilar resources will be recognized by one of skill in the computing arts.

Some embodiments have a specific machine learning architecture. In some embodiments, the associating 502 include at least one of the following: executing 604 a neural network machine learning model 408, 328; or executing 604 a random forest decision trees machine learning model 410, 328.

Some embodiments use lift as a correlation measure 318. Other measures are used in other embodiments, e.g., other measures of interestingness such as leverage, collective strength, or all-confidence. In some embodiments, assigning the correlation value includes at least one of the following: calculating 606 a lift 418 of occurrence 608 of the category in the categorized alerts collection 310 as an antecedent of the category in the categorized exploit openings collection 314; or calculating 606 a lift 418 of occurrence 608 of the category in the categorized exploit openings collection 314 as an antecedent of the category in the categorized alerts collection 310.

Some embodiments use continually updated data. Update 414 frequency 416 varies according to the embodiment and its settings, e.g., some embodiments operate with data which has been updated monthly for at least three months. These embodiments avoid reliance on static data, e.g., reliance on CVE severity levels. In some embodiments, the process 600 includes repeating the associating 502, assigning 504, and risk score producing 506 at least monthly using updated collections, for at least three months. In some embodiments, other update schedules are used, e.g., at least weekly using updated collections for at least two months, and so on.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as a risk score 132, category collection data structure 214, category data structure 306, categories association rule data structure 308, graph 320 and graph visual representation 322, security finding 402, risk evaluator 212, similarity evaluator 326, and association service 216, in the form of data 118 and instructions 116, read from a removable storage medium 114 and/or another source such as a network connection, to form a configured storage medium. The configured storage medium 112 is capable of causing a computer system 202 to perform technical process steps for cybersecurity prioritization functionality 208, as disclosed herein. The Figures thus help illustrate configured storage media embodiments and process (a.k.a. method) embodiments, as well as system and process embodiments. In particular, any of the process steps illustrated in any of FIG. 2 or 5-10, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a process 600 to enhance cybersecurity functionality of the computing system. This process includes: associating 502 a category in a non-empty categorized alerts collection with a category in a non-empty categorized exploit openings collection, thereby producing a category association rule, the categorized alerts collection including at least one alert category, each alert category containing alerts, the categorized exploit openings collection including zero or more security vulnerability categories containing vulnerabilities and zero or more misconfiguration categories containing misconfigurations; assigning 504 the category association rule a correlation value which represents a measure of a correlation of the category in the categorized alerts collection with the category in the categorized exploit openings collection; and producing 506 a risk score based on the category association rule and on at least one of: an alert, a vulnerability, or a misconfiguration.

In some embodiments, a security finding 402 is an alert, a vulnerability, or a misconfiguration, the process 600 further includes creating 302 the collections 214, and creating the collections includes determining 602 that three environments are similar, and including 612 in at least one of the collections security findings which are collectively from the three environments.

In some embodiments, a security finding 402 is an alert, a vulnerability, or a misconfiguration, the process 600 further includes displaying 124 a visual representation of a graph including nodes and at least one edge, the visual representation including an indication 614 of the risk score.

In some embodiments, a security finding 402 is an alert, a vulnerability, or a misconfiguration, the process 600 further includes displaying 124 a visual representation 322 of a graph including nodes 426 and at least one edge 428, the visual representation identifying 616 a security finding that is utilized by the process to produce 302 at least one category association rule.

In some embodiments, a security finding 402 is an alert, a vulnerability, or a misconfiguration, the process 600 further includes displaying 124 a visual representation 322 of a graph including nodes and at least one edge, the visual representation identifying 616 a security finding that is utilized by the process to produce 506 the risk score.

Additional Observations

Additional support for the discussion of cybersecurity prioritization functionality 208 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present disclosure, has no role in interpreting the claims presented in this disclosure. With this understanding, which pertains to all parts of the present disclosure, examples and observations are offered herein.

In some environments, container security solutions tend to overwhelm security officers with security posture recommendation and security alerts/events that indicate a potential breach or breach attempt, resulting in recommendation an alert fatigue. Some embodiments taught herein reduce this problem by prioritizing security finding handling. In some embodiments, prioritization includes by categorizing vulnerability or attack path findings and security alerts by exploit categories, and correlating and enriching security alerts or posture management recommendations with security findings and associating rules between alerts and recommendation categories by learning correlative occurrences. In some embodiments, when there is a high correlation of a vulnerability and attack path with a security alert, prioritization determines a probability of actual breach is high. Some embodiments determine a likelihood of future breach via an existing vulnerability or attack path and an existing correlation with security alerts.

FIGS. 7 to 9 illustrate some processes 600 which prioritize security findings by the likelihood of an actual previous breach, a potential future breach, or both. During a Phase 1, which is a foundational portion of some processes, an embodiment enriches security findings with exploit categories. This includes categorizing security findings by exploit categories, and enriching findings with correlated categories. Suitable categories 306 are defined or obtained, e.g., from experts or from a security-using community or a security-providing community, or by local admins or security personnel. For instance, categories may reflect tactics or techniques identified in a framework such as the MITRE ATT&CK® model (mark of The MITRE Corporation), the CYBER KILL CHAIN® model (mark of Lockheed Martin Corporation), or the STRIDE™ threat model (mark of Microsoft Corporation), for example.

During a Phase 2, this embodiment learns category association rules which associate categories by correlative occurrences. Machine learning, statistical correlations, or other associative correlation tools and techniques are employed.

During a Phase 3, this embodiment determines the likelihood or risk of an existing breach or future breach. This includes cross correlate alerts and vulnerability findings based on categories and association rules, and determining the likelihood of a breach by an existing correlation between security alerts and vulnerability findings.

Some embodiments provide or utilize a cybersecurity method including enriching security findings with exploit categories; learning category association rules; determining a breach likelihood based on a security finding and a rule; and enhancing security effectiveness or security efficiency or both based on the breach likelihood.

In some embodiments, exploit opening 312 categories reflect an attacker intent, e.g., remote code execution or privilege escalation. Less preferable are categories that reflects a specific low-level method used, e.g., network device command line interface.

In some embodiments, category association rules 308 include association rules that in retrospect are indicative of a same particular incident.

In some embodiments, prioritization of security findings by a static severity that is part of the alert or recommendation is not relied upon. For example, CVEs include largely static values assigned by human researchers to indicate exploitability of a vulnerability. Some embodiments use context to make a more accurate estimate of severity and of likelihood of breach prediction than is possible based largely or entirely on static severity. For example, some embodiments use data collected "in the wild" which is more dynamic than CVE data. Association rules 308 are updated accordingly, based on the most recent data 402. Correlations 316 underlying association rules may change, e.g., as more data 402 becomes available, or as security control changes alter groupings of alerts with incidents, leading in turn to rule 308 changes.

Some embodiments prioritize 206 based on data 134, 136, 138 gathered across similar configurations 404, similar resources 406, similar environments 100, or a combination thereof. Some embodiments correlate 316 over wide data alert categories with exploit opening categories favoring items from the same incident, from the same or a close time (e.g., within one hour), from the same graph 320 path 1002 (e.g., an attack path), or a combination thereof.

In some embodiments, processing occurs with individual security findings 402 as data to categorize, then proceeds with categories 306, and then prioritizes individual findings 402. That is, the individual finding 402 is given a risk score 132 which is computed using aggregated findings and categories as taught herein. The meaning of a given risk score 132 may depend on the kind of finding to which the risk score pertains.

For example, some embodiments begin a particular process 600 instance with a known configuration issue that correlates with a vulnerability in an environment, and proceed to determine the likelihood of an attack, based on findings 402 from that environment and other similar environments. Some embodiments begin a particular process 600 instance with a known alert, and proceed to determine the likelihood that the alert comes from an actual breach as oppose to being a false positive, based on findings 402 from that environment and other similar environments. However, each environment can have its own respective rules 308, even when the environments are similar 324. This may be a result of differences in resources or configurations, for example.

Technical Character

The technical character of embodiments described herein will be apparent to one of ordinary skill in the art, and will also be apparent in several ways to a wide range of attentive readers. Some embodiments address technical activities such as executing 604 a machine learning model 328, visualizing 322 a graph 320 on a display 124, calculating 606 a lift 418 or other correlation value 318, and categorizing alerts 136, cybersecurity vulnerabilities 138, and computing system misconfigurations 134, which are each an activity deeply rooted in computing technology. Some of the technical mechanisms discussed include, e.g., a categories association service 216, a risk evaluator 212, similarity evaluators 326 for environments, resources, and configurations, security tools 122, and machine learning models 328. Some of the technical effects discussed include, e.g., distinguishing a false positive 512 alert from alerts that arise due to a breach 516, predicting 514 the likelihood of a breach 516, and visually representing 322 a vulnerable system 102 together with security findings 402 about the system and the path(s) 1002 to the system 102 from the Internet. Thus, purely mental processes and activities limited to pen-and-paper are clearly excluded. Other advantages based on the technical characteristics of the teachings will also be apparent to one of skill from the description provided.

Software development and cybersecurity are each a technical activity which cannot be performed mentally, or entirely by pen and paper. One of skill understands that they are effectively part of software functionality, because their efficiency and effectiveness—or lack thereof—translates into software that functions efficiently and effectively—or does not. Improvements described herein to software development tools and cybersecurity tools, e.g., security controls 122, security information and event management (SIEM) tools 122, and cloud security posture management (CSPM) and cloud workload protection solutions 122, are accordingly improvements in software functionality.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as an enhanced SIEM or CSPM 122 which upon command displays the path(s) 1002 that contain vulnerable resources.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to determine whether an alert 136 is most likely a false positive 512, and how to leverage data 118 from other environments 100 to help secure a particular environment 210, 100. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

ADDITIONAL COMBINATIONS AND VARIATIONS

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present disclosure, has no role in interpreting the claims presented in this patent disclosure.

Some embodiments use or provide a process performed by computing system to enhance cybersecurity, the process including: associating a category in a categorized alerts collection which is non-empty with a category in a categorized exploit openings collection which is non-empty, the associating producing a category association rule, the categorized alerts collection including an alert category, the alert category containing alerts, the categorized exploit openings collection including zero or more security vulnerability categories containing vulnerabilities and zero or more misconfiguration categories containing misconfigurations; assigning the category association rule a correlation value which represents a measure of a correlation of the category in the categorized alerts collection with the category in the categorized exploit openings collection; and producing a risk score based on the category association rule and on at least one of: an alert, a vulnerability, or a misconfiguration.

In some embodiments, the process further includes utilizing the risk score by distinguishing an accurate security breach alert from a false positive security breach alert.

In some embodiments, the process further includes utilizing the risk score by accurately predicting a security breach prior to an occurrence of the security breach.

In some embodiments, the process further includes creating the categorized alerts collection and the categorized exploit openings collection, and the creating includes determining that two environments are similar, and security findings in at least one of the collections are collectively from the two environments. A security finding is an alert, a vulnerability, or a misconfiguration.

In some embodiments, the process further includes creating the categorized alerts collection and the categorized exploit openings collection, and the creating includes determining that two configurations are similar, and security findings in at least one of the collections collectively pertain to the two configurations. A security finding is an alert, a vulnerability, or a misconfiguration.

In some embodiments, the process further includes creating the categorized alerts collection and the categorized exploit openings collection, and the creating includes determining that two resources are similar, and security findings in at least one of the collections collectively pertain to the two resources. A security finding is an alert, a vulnerability, or a misconfiguration.

In some embodiments, the associating includes at least one of the following: executing a neural network machine learning model; or executing a random forest decision trees machine learning model.

In some embodiments, assigning the correlation value includes at least one of the following: calculating a lift of occurrence of the category in the categorized alerts collection as an antecedent of the category in the categorized exploit openings collection; or calculating a lift of occurrence of the category in the categorized exploit openings collection as an antecedent of the category in the categorized alerts collection.

In some embodiments, the process further includes repeating the associating, assigning, and risk score producing at least monthly using updated collections, for at least three months.

Some embodiments use or provide a computing system which is configured to enhance cybersecurity, the computing system including: a digital memory; a processor set including at least one processor, the processor set in operable communication with the digital memory; a categorized alerts collection which is non-empty, the categorized alerts collection including an alert category, the alert category containing alerts; a categorized exploit openings collection which is non-empty, the categorized exploit openings collection including zero or more security vulnerability categories containing vulnerabilities and zero or more misconfiguration categories containing misconfigurations; an association service which upon execution by the processor set produces a rule collection which is non-empty, the rule collection including a category association rule, the category association rule associates a category in the categorized alerts collection with a category in the categorized exploit openings collection, and the category association rule has a correlation value representing a measure of a correlation of the category in the categorized alerts collection with the category in the categorized exploit openings collection; and a risk evaluator which upon execution by the processor set produces a risk score based on an exploit opening or an alert or both.

In some embodiments, the categorized alerts collection includes alerts from multiple environments which are or were collectively accessible to multiple independently controlled entities.

In some embodiments, the categorized exploit openings collection includes at least one of the following: vulnerabilities from multiple environments which are or were collectively accessible to multiple independently controlled entities; or misconfigurations from multiple environments which are or were collectively accessible to multiple independently controlled entities.

In some embodiments, the computing system further includes a graph having a visual representation, the graph including nodes and at least one edge, and the system is further characterized in at least one of the following ways: the visual representation includes an indication of the risk score; the visual representation identifies a security finding that is utilized by the association service to produce at least one category association rule; or the visual representation identifies a security finding that is utilized by the risk evaluator to produce the risk score. A security finding is an alert, a vulnerability, or a misconfiguration.

In some embodiments, the computing system further includes at least one of the following: a resource similarity evaluator which upon execution by the processor set produces a measure of a similarity of two resources; or an environment similarity evaluator which upon execution by the processor set produces a measure of a similarity of two environments.

In some embodiments, the association service includes a machine learning model.

Some embodiments use or provide a computer-readable storage device configured with data and instructions which upon execution by a processor cause a computing system to perform a process to enhance cybersecurity functionality of the computing system, the process including: associating a category in a categorized alerts collection which is non-empty with a category in a categorized exploit openings collection which is non-empty, thereby producing a category association rule, the categorized alerts collection including an alert category, the alert category containing alerts, the categorized exploit openings collection including zero or more security vulnerability categories containing vulnerabilities and zero or more misconfiguration categories containing misconfigurations; assigning the category association rule a correlation value which represents a measure of a correlation of the category in the categorized alerts collection with the category in the categorized exploit openings collection; and producing a risk score based on the category association rule and on at least one of: an alert, a vulnerability, or a misconfiguration.

In some embodiments, the process further includes creating the categorized alerts collection and the categorized exploit openings collection, and creating the collections includes determining that three environments are similar, and security findings in at least one of the collections are collectively from the three environments.

In some embodiments, the process further includes displaying a visual representation of a graph including nodes and at least one edge, the visual representation including an indication of the risk score.

In some embodiments, the process further includes displaying a visual representation of a graph including nodes and at least one edge, the visual representation identifying a security finding that is utilized by the process to produce at least one category association rule.

In some embodiments, the process further includes displaying a visual representation of a graph including nodes and at least one edge, the visual representation identifying a security finding that is utilized by the process to produce the risk score.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CCPA: California Consumer Privacy Act
CD: compact disc
CPRA: California Consumer Privacy Act
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
IDE: integrated development environment
IL: intermediate language
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
VCDPA: Virginia Consumer Data Protection Act
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

"Software component" means source code, any digital item processed by a build tool to create part of an executable code, and executable code.

"Security vulnerability" means any aspect of or gap in the structure or operation of a software component which permits or aids a break or reduction of confidentiality, integrity, availability, or privacy of the software component or of data which is accessible to the software component.

"Misconfiguration" means any aspect of or gap in the installation or configuration of a software component which permits or aids a break or reduction of confidentiality, integrity, availability, or privacy of the software component or of data which is accessible to the software component.

"Exploit opening" means a security vulnerability or a misconfiguration.

"Recommendation" means a recommendation regarding a security vulnerability or a misconfiguration. "Recommendation categories" include security vulnerability categories and misconfiguration categories.

"Alert" means an automatically generated message or notice of an event or a state in a computing system. In some embodiments, an alert (aka security alert) is a notification of a potential breach based on an event or a group of events.

"Security finding" means an alert, a security vulnerability, or a misconfiguration.

An "infrastructure provider" provides cloud infrastructure, e.g., a virtual machine, a virtual network, an operating system, hypervisor access or support, IaaS (infrastructure as a service), a service to create or deploy or monitor any of the foregoing, or monitored use of data center hardware.

A "tenant" is a recipient of infrastructure from an infrastructure provider.

An "independently controlled entity" in a cloud is a tenant or an infrastructure provider which is recognized in its legal jurisdiction as being separate from other legal entities with respect to at least one of the following: obligation to a tax authority, property ownership, product liability, a contractual right or obligation, a right under criminal law, or a right or obligation under a privacy regulation or law such as CCPA, CPRA, GDPR, or VCDPA. Some examples of an independently controlled entity are: cloud tenant regardless of whether that tenant pays for use of the cloud, cloud service provider, customer who pays a cloud service provider, or government agency.

An "environment" of an independently controlled entity is a computing environment exclusive of the public internet which is accessible to the independently controlled entity.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Cybersecurity prioritization operations such as associating 502 categories 306, visualizing 322 graphs 320, evaluating 326 environment similarity 324, calculating 606 a correlation value 318, and many other operations discussed herein, are understood to be inherently digital. A human mind cannot interface directly with a CPU or other processor, or with RAM or other digital storage, to read and write the necessary data to perform the cybersecurity prioritization steps 600 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this patent disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as alerting, assigning, associating, calculating, collecting, correlating, distinguishing, evaluating, executing, identifying, learning, predicting, producing, updating, utilizing, visualizing (and alerts, alerted, assigns, assigned, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 digital data in a system 102; data structures, values, source code, and other examples are discussed herein
- 120 kernel(s), e.g., operating system(s), BIOS, UEFI, device drivers
- 122 tool in a computing system, e.g., software development tool, security tool, communication tool, etc.; computational and hence non-human
- 124 display screens, also referred to as "displays"; may also refer to computational act of configuring an image or pixels in a display
- 126 computing hardware not otherwise associated with a reference number 106, 108, 110, 112, 114, 124
- 128 cloud, also referred to as cloud environment or cloud computing environment
- 130 risk
- 132 risk score, i.e., risk as represented by a digital value in a computing system
- 134 misconfiguration of a device in a computing system, e.g., a configuration 404 which creates a risk that is avoidable by changing the configuration
- 136 alert, digital value in a system 102
- 138 vulnerability as represented digitally in a system 102

202 enhanced computing system, i.e., system 102 enhanced with cybersecurity prioritization functionality as taught herein 204 cybersecurity in a system 202; also referred to as "security"; a status, condition, or characteristic which directly impacts the confidentiality, integrity, availability, or privacy of data in a computing system 102

206 prioritization, a computational activity or computational result thereof, which reduces usage of computational resources (storage, processing cycles, bandwidth, electricity) and also maintains or increases system security, e.g., by distinguishing false positive alerts, predicting a breach or other cyberattack, or lowering the risk of a breach 208 cybersecurity prioritization functionality, e.g., software or specialized hardware which performs or is configured to perform steps 502 and 508, or steps 302, 504, and 506, or steps 502, 504, and 506, or step 302 and any of steps 510, 514, 610, 614, or 616, or any software or hardware which performs or is configured to perform a novel method 600 or a computational cybersecurity prioritization activity first disclosed herein 210 an environment 102 which is secured at least in part by functionality 208

212 risk evaluator mechanism, e.g., in a system 202

214 category 306 collection, e.g., in a system 202

216 categories association service, e.g., in a system 202

302 computationally create a collection of category association rules 308, e.g., by gathering data 402, dividing at least some of it into categories 306, identifying category correlations using lift or another metric, and selecting a top portion of the resulting correlations with associated correlation values for use as rules 308; selection of the top portion may be, e.g., based on a correlation value threshold, based on preferences for particular categories, based on a min or max number of rules, or a combination thereof; 302 also refers to computationally creating a rule 308

304 collection (e.g., group, set, list) data structure containing rules 308

306 category of security findings; data structure 308 category association rule data structure, also referred to as association rule or rule 310 collection (e.g., group, set, list) of alert categories (that is, of categories which are defined in terms of alerts)

312 exploit opening, namely, vulnerabilities or misconfigurations or both, as represented in a system 202

314 collection (e.g., group, set, list) of exploit opening categories (that is, of categories which are defined in terms of exploit openings)

316 correlation of two or more categories in a dataset; also refers to computational activity which searches for such a correlation or records such a correlation when one is identified 318 correlation value which represents strength or rareness or another characteristic of a correlation; digital 320 graph data structure having at least one edge and at least two nodes 322 visual representation of a graph or a subgraph (smaller portion of the graph which is itself also a graph), as shown on a display or other visual medium (e.g., printout); also refers to computational activity visualizing which is configuring a display with a representation 322

324 similarity of two items as represented in a system 202

326 similarity evaluator, e.g., mechanism which measure extent of similarity of two items 328 machine learning model; computational 330 interface, generally 402 security finding, as data in a system 202

404 device configuration, as data in a system 202

406 resource in a computing system; digital or computational or both; some examples are files 448 and other artifacts which have a data storage capability, virtual machines or clusters and other artifacts which have a computational capability, and network 108 artifacts which have a data transmission capability; a given artifact may have different kinds of capabilities, e.g., virtual machines often have compute, storage, and transmission capabilities 408 neural network in a system 102

410 random forest decision tree in a system 102

412 independently control entity, as represented in a system 102

414 data update in a system 102

416 frequency or other schedule of updates 414, as represented in a system 102

418 lift value, as represented in a system 202

420 virtual machine in a system 102

422 virtual network in a system 102

424 IP address (v4 or v6) in a system 102

426 node in a graph 320

428 edge in a graph 320

430 subnet in a system 102

500 flowchart; 500 also refers to cybersecurity prioritization processes that are illustrated by or consistent with the FIG. 5 flowchart 502 computationally associate an alerts category with an exploit openings category based on a correlation metric 504 computationally assign a correlation value 318 to an association of two categories 506 computationally produce a risk score 508 computationally utilize a risk score to enhance security 510 computationally distinguish between a false positive alert and other alerts, or computationally assign an investigation priority to an alert relative to other alerts 512 false positive or low priority alert 514 computationally predict a breach likelihood 516 breach of a system 102, e.g., unauthorized activity which places data at risk 600 flowchart; 600 also refers to cybersecurity prioritization processes that are illustrated by or consistent with the FIG. 6 flowchart, which incorporates the FIG. 5 flowchart and other steps taught herein 602 computationally determine extent of similarity or dissimilarity of two items 604 computationally execute a machine learning model 606 computationally calculate a lift or other measure of interestingness of an occurrence 608

608 occurrence of two categories 306 together, e.g., in an incident or in a short time period or on a path 1002

610 computationally enhance cybersecurity, e.g., by reducing risk or reducing computational resource usage spent at a given level of risk 612 computationally include collectively accessible items in a process 600

614 computationally indicate, e.g., visualize or display or identify, a risk score in a graph representation 322

616 computationally identify a finding 402 in a graph representation 322

618 any step or item discussed in the present disclosure that has not been assigned some other reference numeral; 618 may thus be shown expressly as a reference numeral for various steps or items or both, and may be added as a reference numeral (in the current disclosure or any subsequent patent application which claims priority to the current disclosure) for various steps or items or both without thereby adding new matter
700 phase 1 of some processes 600
702 category enricher mechanism in a system 202
704 collection (e.g., group, set, list) of vulnerability categories (that is,
of categories which are defined in terms of vulnerabilities); and example of collection 314
800 phase 2 of some processes 600
900 phase 3 of some processes 600
902 cross-finding enricher mechanism in a system 202
904 cross-correlated findings 402
906 evaluated findings 402
1002 path in a graph 320

CONCLUSION

Some embodiments bridge a gap between focusing on security alerts 136 raised by conditions and events that have already occurred, and focusing on vulnerabilities 138 that might be exploited in the future. Alerts 136 are organized 702 into alert categories 310, vulnerabilities 138 are organized 702 into vulnerability categories 704, and are optionally supplemented with misconfiguration 134 categories 306. Correlations 316 are identified 302 between alert categories 306 and vulnerability or misconfiguration categories 306, and the correlation values 318 are noted, to produce 302 category association rules 308. The alerts 136, vulnerabilities 138, and other security findings 402 are gathered 612 in some situations from multiple similar environments 100, and in some cases are filtered 326 to pertain to similar resources 406 or similar configurations 404. The category association rules 308 are utilized 508 to perform cybersecurity prioritizations 206 such as assigning 510 priority levels to alerts 136 and assigning 514 likelihood levels to potential breaches 516. Graphs 320 showing resources 406, 426 and data flow paths 428, 1002 are annotated 614 with risk scores 132 or annotated 616 with security findings 402 that are relevant to the applicable category association rules 308.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/ or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; one is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process performed by computing system to enhance cybersecurity, the process comprising:
   associating a category in a categorized alerts collection which is non-empty with a category in a categorized exploit openings collection which is non-empty, the associating producing a category association rule, the categorized alerts collection comprising an alert category, the alert category containing alerts, the categorized exploit openings collection comprising zero or more security vulnerability categories containing vulnerabilities and zero or more misconfiguration categories containing misconfigurations;
   assigning the category association rule a correlation value which represents a measure of a correlation of the category in the categorized alerts collection with the category in the categorized exploit openings collection; and
   producing a risk score based on the category association rule and on at least one of: an alert, a vulnerability, or a misconfiguration.

2. The process of claim 1, further comprising utilizing the risk score by distinguishing an accurate security breach alert from a false positive security breach alert.

3. The process of claim 1, further comprising utilizing the risk score by accurately predicting a security breach prior to an occurrence of the security breach.

4. The process of claim 1, wherein the process further comprises creating the categorized alerts collection and the categorized exploit openings collection, and wherein the creating comprises determining that two environments are similar, and wherein security findings in at least one of the collections are collectively from the two environments.

5. The process of claim 1, wherein the process further comprises creating the categorized alerts collection and the categorized exploit openings collection, and wherein the creating comprises determining that two configurations are similar, and wherein security findings in at least one of the collections collectively pertain to the two configurations.

6. The process of claim 1, wherein the process further comprises creating the categorized alerts collection and the categorized exploit openings collection, and wherein the creating comprises determining that two resources are similar, and wherein security findings in at least one of the collections collectively pertain to the two resources.

7. The process of claim 1, wherein the associating comprises at least one of the following:
   executing a neural network machine learning model; or
   executing a random forest decision trees machine learning model.

8. The process of claim 1, wherein assigning the correlation value comprises at least one of the following:
   calculating a lift of occurrence of the category in the categorized alerts collection as an antecedent of the category in the categorized exploit openings collection; or
   calculating a lift of occurrence of the category in the categorized exploit openings collection as an antecedent of the category in the categorized alerts collection.

9. The process of claim 1, further comprising repeating the associating, assigning, and risk score producing at least monthly using updated collections, for at least three months.

10. A computing system which is configured to enhance cybersecurity, the computing system comprising:
- a digital memory;
- a processor set comprising at least one processor, the processor set in operable communication with the digital memory;
- a categorized alerts collection which is non-empty, the categorized alerts collection comprising an alert category, the alert category containing alerts;
- a categorized exploit openings collection which is non-empty, the categorized exploit openings collection comprising zero or more security vulnerability categories containing vulnerabilities and zero or more misconfiguration categories containing misconfigurations;
- an association service which upon execution by the processor set produces a rule collection which is non-empty, the rule collection comprising a category association rule, wherein the category association rule associates a category in the categorized alerts collection with a category in the categorized exploit openings collection, and the category association rule has a correlation value representing a measure of a correlation of the category in the categorized alerts collection with the category in the categorized exploit openings collection; and
- a risk evaluator which upon execution by the processor set produces a risk score based on an exploit opening or an alert or both.

11. The computing system of claim 10, wherein the categorized alerts collection comprises alerts from multiple environments which are or were collectively accessible to multiple independently controlled entities.

12. The computing system of claim 10, wherein the categorized exploit openings collection comprises at least one of the following:
- vulnerabilities from multiple environments which are or were collectively accessible to multiple independently controlled entities; or
- misconfigurations from multiple environments which are or were collectively accessible to multiple independently controlled entities.

13. The computing system of claim 10, further comprising a graph having a visual representation, the graph comprising nodes and at least one edge, and wherein the system is further characterized in at least one of the following ways:
- the visual representation comprises an indication of the risk score;
- the visual representation identifies a security finding that is utilized by the association service to produce at least one category association rule; or
- the visual representation identifies a security finding that is utilized by the risk evaluator to produce the risk score.

14. The computing system of claim 10, further comprising at least one of the following:
- a resource similarity evaluator which upon execution by the processor set produces a measure of a similarity of two resources; or
- an environment similarity evaluator which upon execution by the processor set produces a measure of a similarity of two environments.

15. The computing system of claim 10, wherein the association service comprises a machine learning model.

16. A computer-readable storage device configured with data and instructions which upon execution by a processor cause a computing system to perform a process to enhance cybersecurity functionality of the computing system, the process comprising:
- associating a category in a categorized alerts collection which is non-empty with a category in a categorized exploit openings collection which is non-empty, thereby producing a category association rule, the categorized alerts collection comprising an alert category, the alert category containing alerts, the categorized exploit openings collection comprising zero or more security vulnerability categories containing vulnerabilities and zero or more misconfiguration categories containing misconfigurations;
- assigning the category association rule a correlation value which represents a measure of a correlation of the category in the categorized alerts collection with the category in the categorized exploit openings collection; and
- producing a risk score based on the category association rule and on at least one of: an alert, a vulnerability, or a misconfiguration.

17. The storage device of claim 16, wherein the process further comprises creating the categorized alerts collection and the categorized exploit openings collection, and wherein creating the collections comprises determining that three environments are similar, and wherein security findings in at least one of the collections are collectively from the three environments.

18. The storage device of claim 16, wherein the process further comprises displaying a visual representation of a graph comprising nodes and at least one edge, the visual representation comprising an indication of the risk score.

19. The storage device of claim 16, wherein the process further comprises displaying a visual representation of a graph comprising nodes and at least one edge, the visual representation identifying a security finding that is utilized by the process to produce at least one category association rule.

20. The storage device of claim 16, wherein the process further comprises displaying a visual representation of a graph comprising nodes and at least one edge, the visual representation identifying a security finding that is utilized by the process to produce the risk score.

* * * * *